United States Patent
Wilson et al.

(10) Patent No.: US 9,681,122 B2
(45) Date of Patent: Jun. 13, 2017

(54) MODIFYING DISPLAYED IMAGES IN THE COUPLED ZONE OF A STEREOSCOPIC DISPLAY BASED ON USER COMFORT

(71) Applicant: zSpace, Inc., Sunnyvale, CA (US)

(72) Inventors: Mark P. Wilson, San Jose, CA (US); Douglas C. Twilleager, Campbell, CA (US); David J. Borel, Sunnyvale, CA (US)

(73) Assignee: zSpace, Inc., Sunnyvale, CA (US)

( * ) Notice: Subject to any disclaimer, the term of this patent is extended or adjusted under 35 U.S.C. 154(b) by 344 days.

(21) Appl. No.: 14/257,105

(22) Filed: Apr. 21, 2014

(65) Prior Publication Data
US 2015/0304645 A1 Oct. 22, 2015

(51) Int. Cl.
*H04N 7/18* (2006.01)
*H04N 13/04* (2006.01)
*G06F 3/01* (2006.01)
*H04N 13/00* (2006.01)

(52) U.S. Cl.
CPC ......... *H04N 13/0468* (2013.01); *G06F 3/012* (2013.01); *H04N 13/0022* (2013.01)

(58) Field of Classification Search
USPC .......................................................... 348/51
See application file for complete search history.

(56) References Cited

U.S. PATENT DOCUMENTS

| | | | |
|---|---|---|---|
| 5,726,704 A | 3/1998 | Uomori | |
| 6,392,689 B1* | 5/2002 | Dolgoff | G03B 35/16 348/44 |
| 6,501,468 B1* | 12/2002 | Kaji | H04N 13/0022 345/419 |
| 7,002,749 B2* | 2/2006 | Kremen | G02B 25/008 348/51 |
| 7,720,371 B2* | 5/2010 | Hong | G03B 13/18 348/348 |
| 7,899,321 B2* | 3/2011 | Cameron | G03B 35/00 348/345 |

(Continued)

FOREIGN PATENT DOCUMENTS

EP 2482560 A2 1/2012

OTHER PUBLICATIONS

Schertenlieb, Sebastien "Making Stereoscopic 3D Games on PlayStation3 (PS3 TM)," FMX 2011, May 4, 2011, Sony Computer Entertainment Europe Limited (99 pages).

*Primary Examiner* — Leron Beck
(74) *Attorney, Agent, or Firm* — Meyertons Hood Kivlin Kowert & Goetzel, P.C.; Jeffrey C. Hood; Brian E. Moore

(57) ABSTRACT

Systems and methods for enhancement of a coupled zone of a 3D stereoscopic display. The method may include determining a size and a shape of the coupled zone. The coupled zone may include a physical volume specified by the user's visual depth of field with respect to screen position of the 3D stereoscopic display and the user's point of view. Content may be displayed at a first position with a virtual 3D space and the first position may correspond to a position within the coupled zone. It may be determined that the content is not contained in the coupled zone or is within a specified distance from a boundary of the coupled zone and, in response, display of the content may be adjusted such that the content has a second position in the virtual 3D space that corresponds to another position within the coupled zone.

28 Claims, 8 Drawing Sheets

(56) References Cited

U.S. PATENT DOCUMENTS

| | | | |
|---|---|---|---|
| 8,514,225 B2* | 8/2013 | Genova | G06T 15/205 345/422 |
| 8,773,429 B2 | 7/2014 | Hsu | |
| 2011/0074933 A1* | 3/2011 | Held | H04N 13/0033 348/51 |
| 2011/0109720 A1* | 5/2011 | Smolic | H04N 13/0011 348/43 |
| 2011/0149042 A1* | 6/2011 | Lee | H04N 13/004 348/46 |
| 2011/0228049 A1* | 9/2011 | Kazakevich | A61B 1/0005 348/45 |
| 2012/0105611 A1 | 5/2012 | Godar | |
| 2012/0120195 A1* | 5/2012 | Shows | H04N 13/0022 348/46 |
| 2012/0307023 A1* | 12/2012 | Freiburg | H04N 13/0022 348/51 |

\* cited by examiner

MODIFYING DISPLAYED IMAGES IN THE COUPLED ZONE OF A STEREOSCOPIC DISPLAY BASED ON USER COMFORT

TECHNICAL FIELD

This disclosure relates to the field of digital display, and more particularly to enhancing the coupled zone of a stereoscopic display.

DESCRIPTION OF THE RELATED ART

Three dimensional (3D) displays (actually, simulated 3D, e.g., via stereo display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255.

3. Panel—This component is the display itself, typically a liquid crystal display (LCD), but other displays are possible, and takes as input the video levels (e.g., for R, G and B) for each pixel as output from the scaler, and converts them to voltages, which are then delivered to each pixel on the display. The panel itself may modify the video levels before converting them to voltages.

The video chain generally modifies the video levels in two ways that have associated shortcomings for stereo displays, specifically, gamma correction, and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal display, in a stereo display, for each video frame there are two images—right and left. The right image must be delivered to only the right eye, and the left image must be delivered to only the left eye. In a time sequential stereo display, this separation of right and left images is performed in time, i.e., the left and right images are presented sequentially, and thus, contains some time-dependent element which separates these two images. There are two common architectures.

The first architecture uses a device called a polarization switch (PS) which may be a distinct (separate) or integrated LC device or other technology switch, which is placed in front of the LCD panel (or any other type of imaging panel, e.g., an OLED (organic light emitting diode) panel), a plasma display, etc., or any other pixelated panel display used in a time-sequential stereo imaging system, specifically, between the display panel and the viewer, as shown in FIG. 2. The purpose of the PS is to switch the light transmitted from the display panel between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

This allows achievement of the stereo effect shown in prior art FIG. 3. As may be seen, the top portion of the figure shows the (display) panel switching between a left image and a right image. Synchronous with the panel switching, the PS is switching between a Left State and a Right State, as shown. These two states emit two corresponding orthogonal polarization states, as mentioned above. As FIG. 3 further shows, the system includes stereo eyewear that is designed such that the left lens will only pass the Left State polarization and the right lens will only pass the Right State polarization. In this way, separation of the right and left images is achieved.

The second conventional architecture uses stereo shutter glasses, which replace (or integrate the functionality of) the PS and eyewear. In such systems, each eye is covered by an optical shutter, which can be either open or closed. Each of these shutters is opened and closed synchronously with the display panel in such a way that when the left image is shown on the display, only the left eye shutter is open, and when the right image is shown on the display, only the right eye shutter is open. In this manner, the left and right views are (alternatingly) presented to the user's left and right eyes, respectively.

Coupled Zone

As used herein, the term "coupled zone" refers to a physical volume in which the user of a 3D stereoscopic display can view 3D content within the human eye's natural depth of field. As shown in FIG. 4, when a person sees an object in the physical world, the person's eyes converge on, or look (individually aim) at, the object. Additionally, as the two eyes converge on the object, each eye's lens also focuses (monoscopically) on the object. In this sense, both eyes focus and converge on the object, thus focus and convergence are "coupled."

In contrast, as shown in prior art FIG. 5, when looking at a 3D stereoscopic display, focus must always remain on the 3D stereoscopic display, whereas the eyes must converge at various depths in order to visualize, or see, the 3D illusion. Thus, focus and convergence appear to "de-couple." Note that when focus and convergence de-couple, eye strain may develop if focus and convergence remain de-coupled for a period of time which may lead to discomfort for the viewer.

However, as shown in prior art FIG. 6, there is a coupled zone that is a physical volume which may extend in front of and behind a 3D stereoscopic display, in which focus and convergence remain coupled. In other words, there is a zone based on the human eye's natural depth of field where focus and convergence may not be fully coupled but in which objects may be viewed for an extended period of time without resulting eye strain. Put another way, the "coupled zone" of a 3D stereoscopic display may refer to volume defined by a user's viewing angle, the size of the 3D stereoscopic display, and the distances in front of and behind the 3D display in which a user may view objects for an extended period of time without developing eye strain. Thus, the coupled zone of a particular 3D stereoscopic display may also be referred to as the "comfort zone" of the particular 3D stereoscopic display, i.e., the physical volume in which a user may view virtual images for an extended period of time without experiencing eye strain, and thus, discomfort.

Thus, improved techniques for enhancing the coupled zone of 3D stereoscopic displays are desired.

SUMMARY

Various embodiments of a system and method for presenting content via a three dimensional (3D) stereoscopic display are presented. The system for presenting content via a 3D stereoscopic display may include a 3D stereoscopic display. The 3D stereoscopic display may include one or multiple displays and one or more functional units coupled to the display or displays. The functional unit or units may be configured to perform embodiments of the method for presenting content via a 3D stereoscopic display as described in further detail below.

Additionally, a non-transitory computer readable memory medium may store program instructions executable by a processor to perform embodiments of the method for presenting content via a 3D stereoscopic display as described in further detail below.

In an exemplary embodiment, the method for presenting content via a three dimensional (3D) stereoscopic display may include determining a size and a shape of a coupled zone of a 3D stereoscopic display. The 3D stereoscopic display may present a virtual 3D space to a user. The coupled zone may include a physical volume specified by the user's visual depth of field with respect to screen position of the 3D stereoscopic display and a point of view of the user. Accordingly, the physical volume may correspond to at least a portion of the virtual 3D space.

The method may also include displaying content, e.g., an object, at a first position in the virtual 3D space relative to the point of view of the user in the virtual 3D space. The first position may correspond to a position within the coupled zone. Additionally, the method may determine that the content is not contained in the coupled zone or is within a specified distance from a boundary of the coupled zone.

In response, display of the content in the virtual 3D space may be adjusted such that the content may have a second position in the virtual 3D space that corresponds to another position within the coupled zone.

In one embodiment, the coupled zone may be a first coupled zone and the point of view of the user may be a first point of view of the user. In such embodiments, the method may further include detecting position and movement of the user's head via a head tracking system and determining a second point of view of the user based on the detection. Further, a size and a shape of a second coupled zone of the 3D stereoscopic display may be determined. Accordingly, determining that the content is not contained in the coupled zone may further include determining that the content is not contained in the second coupled zone or is within a specified distance from a boundary of the second coupled zone. Additionally, adjusting display of the content may further include adjusting display of the content in the virtual 3D space such that the second position in the virtual 3D space corresponds to a position within the second coupled zone.

In further embodiments, the method may include one or more additional adjustments in response to determining that the content, or a portion of the content, is not contained in the coupled zone.

For example, the method may further include adjusting disparity of one or more regions of the content. Further, the method may include adjusting size of images rendered in the one or more regions and adjusting perspective of the images rendered in the one or more regions. Additionally, the method may include clamping disparity in a first region of the coupled zone and adjusting disparity in a second region of the coupled zone.

In some embodiments, the content may include a region of interest and a background, and adjusting the display of the content may further include blurring one or more of the region of interest of the content or the background of the content. In one embodiment approximately all of the content may be blurred.

In certain embodiments, adjusting the display of the content may further include adjusting the brightness or the contrast of one or more of the region of interest of the content or the background of the content.

In one embodiment, adjusting the display of the content may further include clipping a region of the content that may extend beyond the boundary of the coupled zone.

In an exemplary embodiment, determining that the content is not contained in the coupled zone or is within a specified distance from a boundary of the coupled zone may further included determining that the content is moving within the coupled zone at a rate. Accordingly, adjusting display of the content may further include limiting the rate (of movement of the content within the coupled zone), thereby limiting a rate at which disparity changes. In one such embodiment, determining that the content is moving may further include determining that the content may be moving in response to one or more of user input manipulating the content or programmatic control of position of the content in the virtual 3D space.

In another embodiment, adjusting display of the content may include partitioning the coupled zone into a plurality of regions. Note that each region of the plurality of regions may have a corresponding maximum disparity value. Thus, the method may include limiting the disparity of each region to the corresponding maximum disparity value.

BRIEF DESCRIPTION OF THE DRAWINGS

A better understanding of the present disclosure can be obtained when the following detailed description of the preferred embodiment is considered in conjunction with the following drawings, in which.

Figure 1:
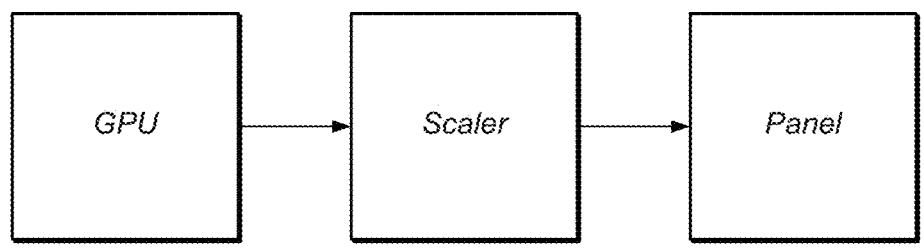
FIG. 1 illustrates a modern display chain, according to the prior art.
Figure 2:
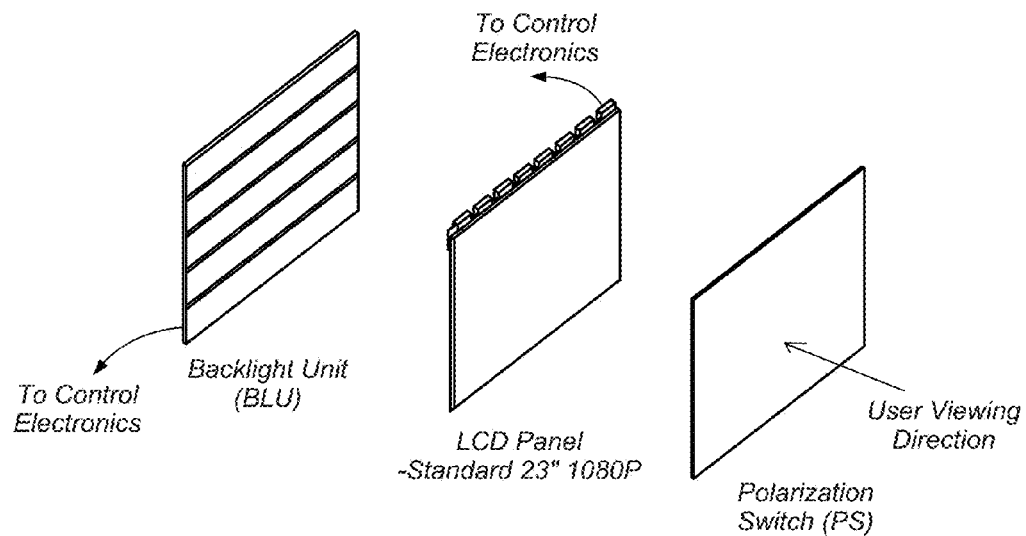
FIG. 2 illustrates an architecture that utilizes a polarization switch, according to the prior art.
Figure 3:
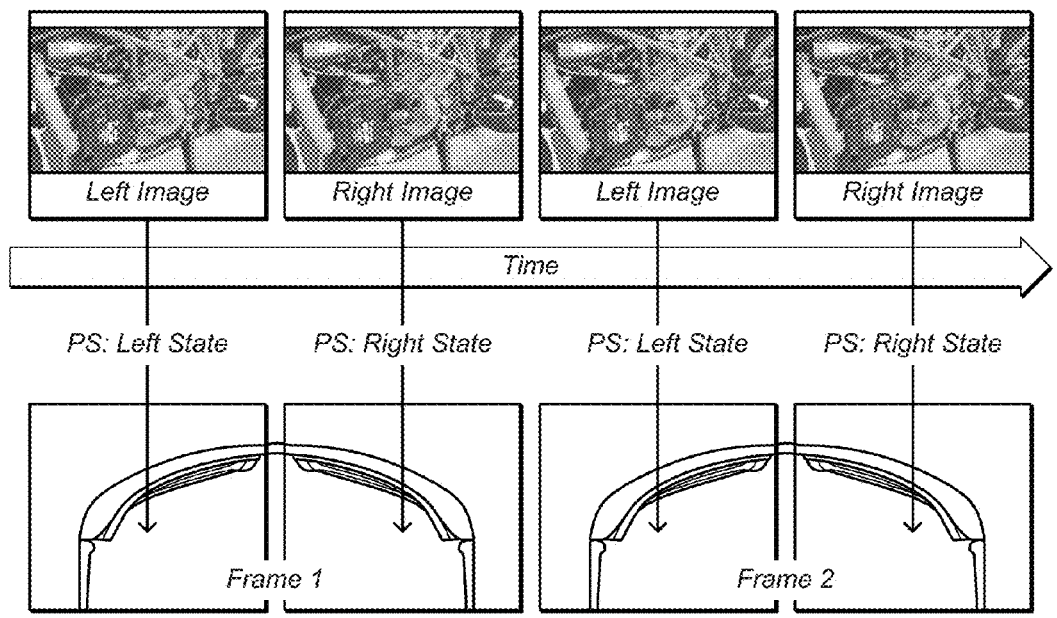
FIG. 3 illustrates a stereo effect (simulated 3D) using polarization switching between left and right views, according to the prior art.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Incorporation by Reference

The following reference is hereby incorporated by reference in its entirety as though fully and completely set forth herein:

U.S. patent application Ser. No. 13/019,384 titled "Modifying Perspective of Stereoscopic Images Based on Changes in User Viewpoint," filed on Feb. 2, 2011.

Terms

The following is a glossary of terms used in the present application:

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Figure 4:
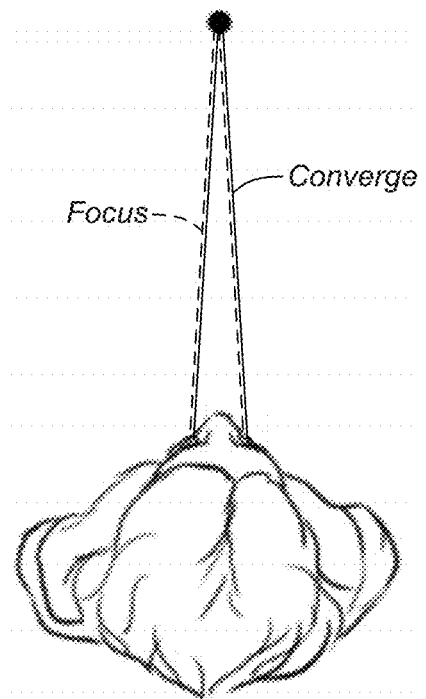
FIG. 4 illustrates a person focusing and converging on an object, according to the prior art.
Figure 5:
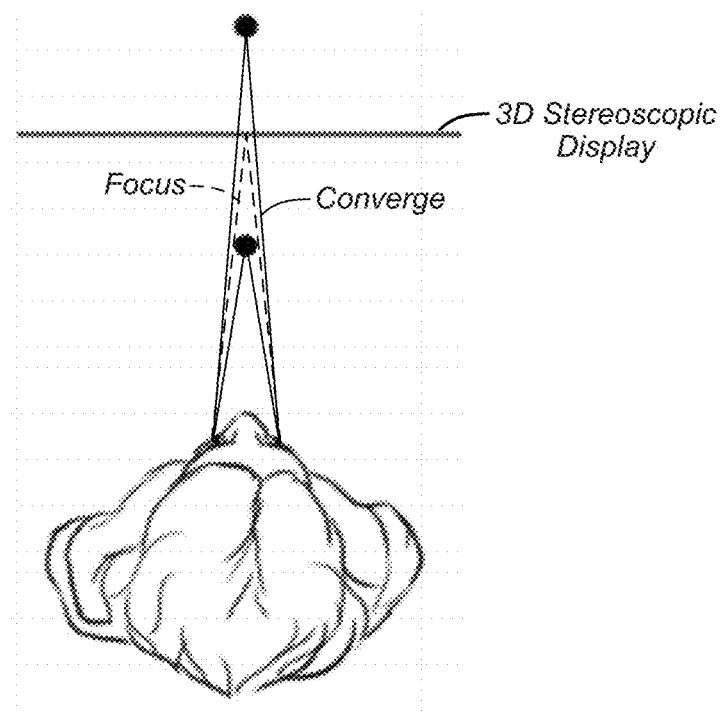
FIG. 5 illustrates a person focusing on a 3D stereoscopic display while converging on virtual content in front of the display, according to the prior art.
Figure 6:
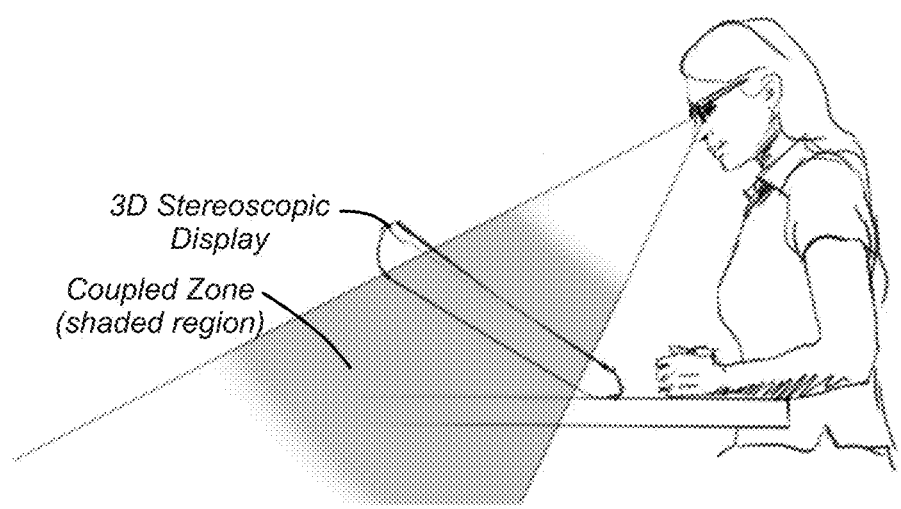
FIG. 6 illustrates a coupled zone of a 3D stereoscopic display, according to the prior art.

Coupled Zone—refers to a physical volume in which the user of a 3D stereoscopic display can view 3D content within the human eye's natural depth of field. As shown in FIG. 4, when a person sees an object in the physical world, the person's eyes converge on, or look (individually aim) at, the object. Additionally, as the two eyes converge on the object, each eye's lens also focuses (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers the display of a 3D object, or content, on a two dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) are positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking device (which is identifying and tracking the user's view) identifies the position/orientation of the user's view, and this information is then correlated to the tracking system's identification of the viewing device's position/orientation (again, with respect to the display device).

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective which is rendered from a viewpoint which is not perpendicular to the display surface. More particularly, the term "horizontal perspective" may typically refer to a perspective which is rendered using a substantially 45 degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in this invention is the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define camera point of the frustum in relation to the render plane. The resultant projection is then rendered onto the viewing device as will be seen by the user.

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint.

Stylus—peripheral devices such as a handheld device, handheld pen device, handheld pointing device, hand, finger, glove, or any object used to directly interact with rendered virtual objects as in a stereo rendered virtual projected objects.

Approximately—refers to a value that is almost correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended. As used in the appended claims, this term does not foreclose additional structure or steps. Consider a claim that recites: "A system comprising a display . . . ." Such a claim does not foreclose the apparatus from including additional components (e.g., a voltage source, a light source, etc.).

Configured To—various units, circuits, or other components may be described or claimed as "configured to" perform a task or tasks. In such contexts, "configured to" is used to connote structure by indicating that the units/ circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc. —these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

FIGS. 7 and 8A-8D—Exemplary System

Figure 7:
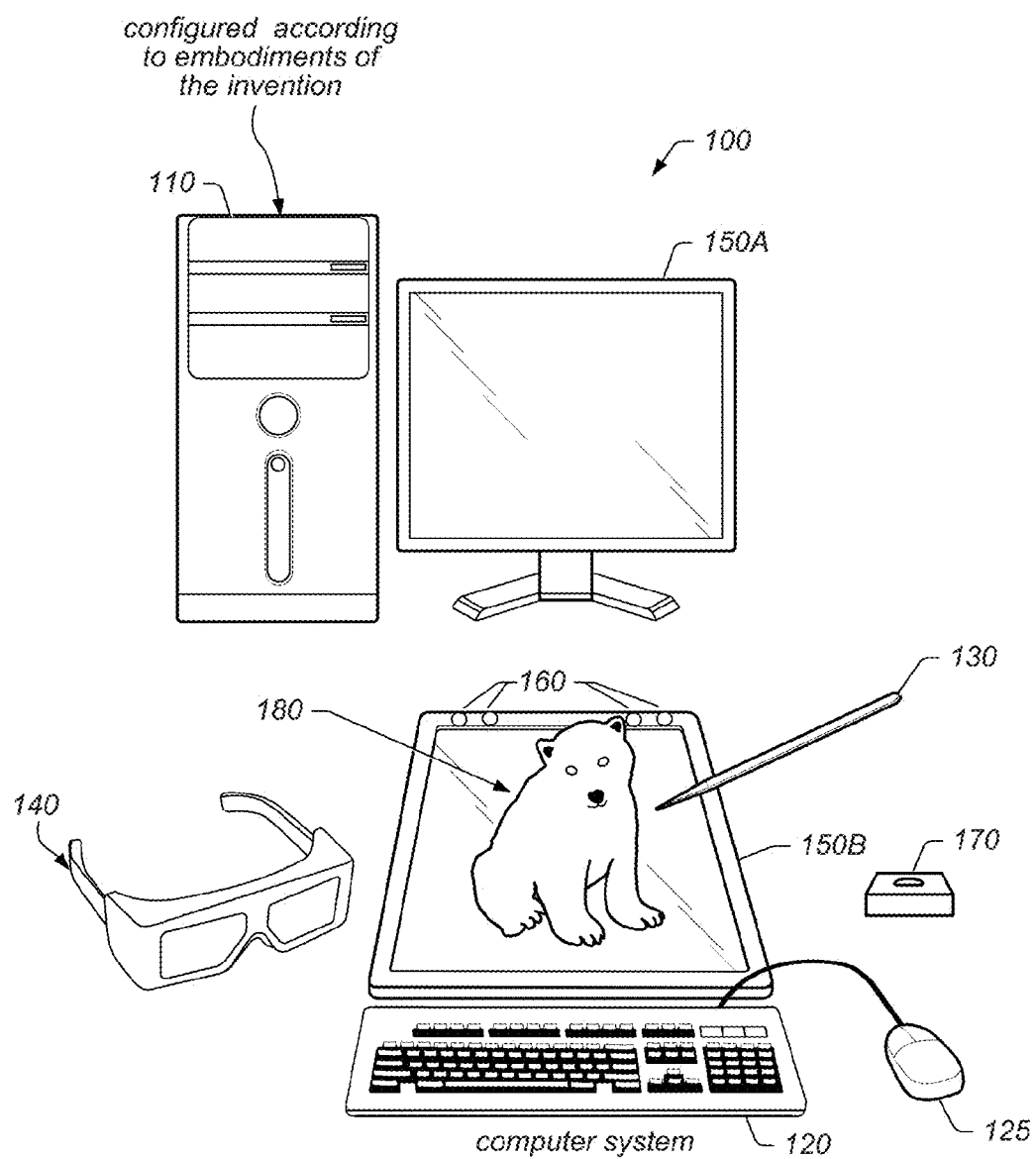
FIG. 7 illustrates an exemplary system configured to implement various embodiments.

FIG. 7 illustrates an exemplary system that may be configured to perform various embodiments described below.

In the embodiment of FIG. 7, computer system 100 may include chassis 110, display 150A and display 150B (which may collectively be referred to as display 150 or "at least one display" 150), keyboard 120, mouse 125, stylus 130, eyewear 140, at least two cameras 160, and stylus caddy 170. Note that in some embodiments, two displays 150A and 150B may not be used; instead, a single display 150 may be used in such embodiments. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments the graphics engine may be implemented on or by a functional unit or processing element. As used herein, and as noted in the Terms section above, the term functional unit or processing element refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium may also store data (and/or program instructions) (e.g., implementing or specifying a computer model) representing a virtual space, which may be used for projecting a 3D scene, such as scene 180, of the virtual space via the display(s) 150. Further, one or more memory mediums may store software which are executable to perform three-dimensional spatial tracking (e.g., user view tracking, user control tracking, etc.), content processing, or other features, as described herein. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic images), or 3D content, such as scene 180, using the display 150A and/or the display 150B. The computer system 100 may also be configured to display a "view" of the 3D scene using the display 150A, the display 150B, and/or another display, as described in more detail below. The "view" of the 3D scene, or content, may refer to a displayed a portion of the 3D scene from a viewpoint within the 3D scene. A viewpoint within the 3D scene may be referred to as a "virtual viewpoint". The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 7 is exemplary only, and other numbers of displays are also envisioned. For example, the computer system 100 may include only a single display or more than two displays, or the displays may be arranged in different manners than shown. In this particular embodiment, the display 150A is configured as a vertical display (which is perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided herein. Additionally, while the displays 150 are shown as flat panel displays, in other embodiments, they may be any type of system which is capable of displaying images, e.g., projection systems. For example, display(s) 150 may be or include, for example, a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D since the actual provided images are 2D, but the scene is conveyed in 3D via the user's interpretation of the provided images. In order to properly view the stereoscopic images (one for each eye for each image frame), the user may wear eyewear 140. Eyewear 140 may be any of anaglyph glasses, polarized glasses, shutter glasses, lenticular glasses, etc., among others. In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position, orientation, etc.) that is usable to determine the position and orientation of the point of view of the user, e.g., via triangulation. In some embodiment, the position input device may use a light sensitive detection system, e.g., may include an infrared detection system to detect the position of the viewer's head to allow the viewer freedom of head movement. Other embodiments of the input device(s) may use the triangulation method of detecting the viewer point of view location, such as one or more sensors (e.g., two cameras, such as CCD cameras) providing position and/or orientation data suitable for the head tracking. The input device(s) may be manually operated by the viewer, such as a keyboard, mouse, trackball, joystick, or the like, or combinations thereof, to indicate the correct display of the horizontal perspective display images. However, any method for tracking the position of the user's head or point of view may be used as desired. Accordingly, the 3D scene may be rendered from the perspective (or point of view) of the user such that user may view the 3D scene with minimal distortions (e.g., since it is based on the point of view of the user). Thus, the 3D scene may be particularly rendered for the point of view of the user, using the position input device.

The relationships among the position/orientation of the display(s) 150 and the point of view of the user may be used to map a portion of the virtual space to the physical space of the system 100. In essence, the physical space and components used may be mapped to the virtual model in order to accurately render a 3D scene of the virtual space.

One or more of the user input devices (e.g., the keyboard 120, the mouse 125, the stylus 130, pointing device, user control device, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with "open space" portions of the 3D scene. Thus, at least a portion of the 3D scene may be presented in this "open space", which is in front of or otherwise outside of the at least one display. In some embodiments, at least a portion of the 3D scene may appear as a hologram above the surface of the display 150. For example, when the horizontal display 150B is used, the 3D scene may be seen as hovering above the horizontal display. It should be noted, however, that a portion of the 3D scene may also be presented as appearing behind the display surface, which is not in "open space". Thus, "open space" refers to a space which the user is able to freely move in and interact with (e.g., where the user is able to place his hands in the space), as opposed to a space the user cannot freely move in and interact with (e.g., where the user is not able to place his hands in the space, such as below the display surface). Thus, "open space" may be considered to be a "hands-on volume" as opposed to an "inner-volume", which may be under the surface of the display(s). Thus, the user may interact with virtual objects in the open space because they are proximate to the user's own physical space. Said another way, the inner volume is located behind (or under) the viewing surface, and so presented objects appear to be inside the physical viewing device. Thus, objects of the 3D scene presented within the inner volume do not share the same physical space with the user and the objects therefore cannot be directly and physically manipulated by hands or hand-held tools such as stylus 130. Rather, they may be manipulated indirectly, e.g., via a computer mouse, a joystick, or virtual representations of hands, handheld tools, or a stylus.

In some embodiments, system 100 may include one or more sensors 160. The one or more sensors 160 may be included in a point of view (POV) tracking system. FIG. 7 illustrates an embodiment using four cameras 160. For instance, two of the four cameras 160 may be used to sense a user view (e.g., point of view) and the other two cameras 160 may be used to sense a user control element (e.g., pointing device, stylus, hand, glove, etc.). Sensors 160 may be used to image a user of system 100, track a user's movement, or track a user's head or eyes, among other contemplated functions. In one embodiment, cameras 160 may track a position and/or an orientation of stylus 130. The information regarding the position and/or orientation of the stylus 130 provided by the one or more sensors 160 may be used in conjunction with other positional information of the system (e.g., an accelerometer and/or gyroscope within the stylus itself) to perform more precise 3D tracking of the stylus 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100 may also include a caddy 170 to store stylus 130. Caddy 170 may also be used to calibrate the orientation of the stylus to a known roll, pitch, and yaw, and so may be in a fixed position relative to cameras 160.

In one embodiment, the system 100 may be configured to couple to a network, such as a wide area network, via an input. The input may be configured to receive image data over the network from a system similar to system 100. In other embodiments, a POV tracking system may include cameras 160. Cameras 160 may be configured to provide visual information regarding a user such that a POV, e.g., the position and orientation, of the user may be determined. However, it should be noted that any type of various POV tracking techniques or devices may be used as desired. Note that as used herein, point of view (POV) of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three position coordinates and three orientation coordinates, although any POV may be used as desired, e.g., three position coordinates and two or three orientation coordinates, and so forth.

Note that in some embodiments, the POV tracking system may rely at least in part on the components of chassis 110 to determine the POV, e.g., via execution of one more programs on a processor or functional unit of chassis 110, although in other embodiments the POV tracking system may operate independently, e.g., may have its own processor or functional unit.

In certain embodiments, the system may include components implementing a perspective based image capture system, for capturing images of target object at a location remote from the system. For example, the perspective based image capture system may include an input configured to couple to a network for receiving information regarding a point of view (POV) from a POV tracking system at a remote location. The information regarding the POV may indicate a position and/or orientation of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., stylus 130 or eyewear 140) to ensure synchronization between the peripheral device and the displayed image. The system may further include a calibration unit to ensure proper mapping of the peripheral device to the display images and proper mapping between the projected images and the virtual images stored in the memory of the chassis 110.

Thus, the system 100 may present a 3D scene which the user may interact with in real time. The system may comprise real-time electronic display(s) 150 that may present or convey perspective images in the open space, and a peripheral device 130 that may allow the user to interact with the 3D scene with hand controlled or hand-held tools. The system 100 may also include means to manipulate the displayed image such as magnification, zoom, rotation, movement, and even display a new image. However, as noted above, in some embodiments, the system may facilitate such manipulations via the user's hands, e.g., without hand-held tools.

Further, while the system 100 is shown as including horizontal display 150B since it simulates the user's visual experience with the horizontal ground, other viewing surfaces may offer a similar 3D illusion experience. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100) may be used as desired.

Figure 8A:
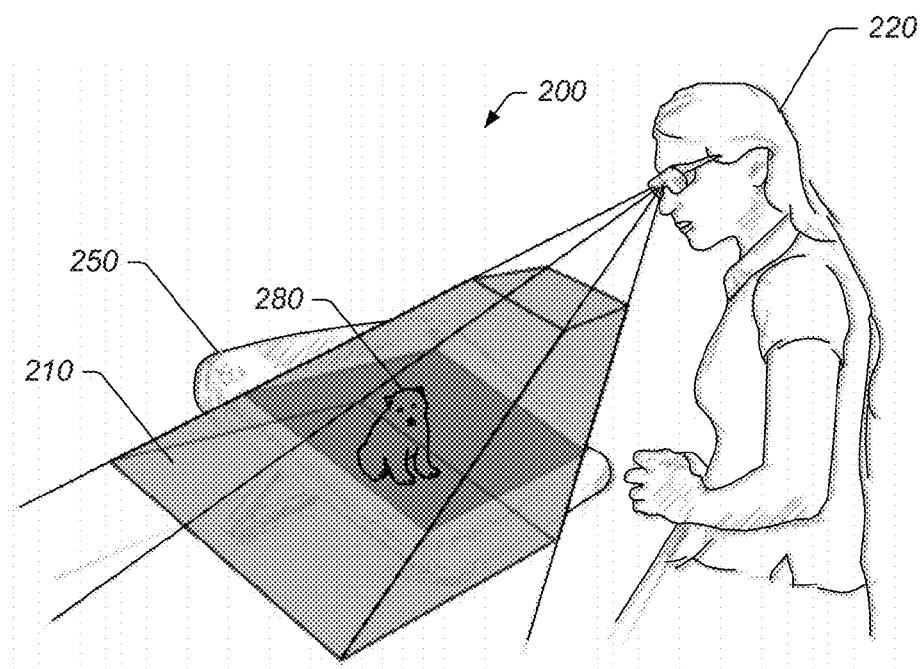
FIGS. 8A-8D illustrate 3D content displayed with an exemplary system configured to implement various embodiments.

Thus, as illustrated in FIG. 8A, in an exemplary embodiment, a 3D stereoscopic display system 200, which may be similar to or the same as system 100 described above, may be configured to display 3D stereoscopic content 280 within a coupled zone 210 using 3D stereoscopic display 250. As discussed above, the term coupled zone refers to a physical volume in which the user of a 3D stereoscopic display, such as user 220, can view 3D content, such as content 280, within the human eye's natural depth of field. The coupled zone may extend to both the hands-on volume (in front of, or above the 3D stereoscopic display 250) and the inner volume (behind, or below the 3D stereoscopic display 250). In such embodiments, a functional unit of display system 200 may be configured to determine the geometry, i.e., the size and shape, of coupled zone 210 of 3D stereoscopic display 250. Note that coupled zone 210 may include a physical volume that may be specified by the depth of field of user 220 with respect to the position of 3D stereoscopic display 250 and the point of view of user 220. Note further that the physical volume of the coupled zone 220 may correspond to at least a portion of a virtual 3D space that may be displayed or rendered using 3D stereoscopic display system 200.

Figure 8B:
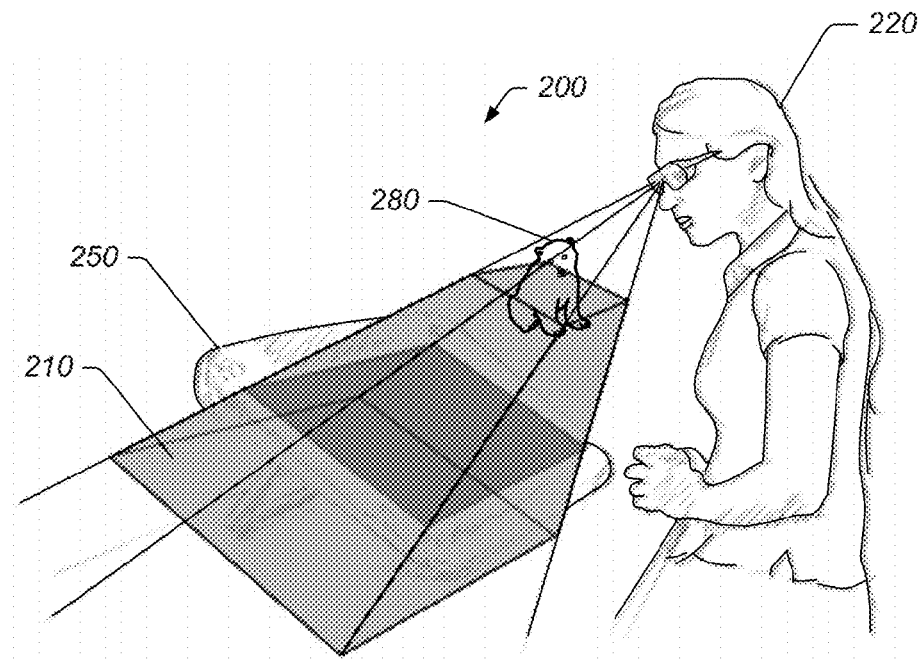
Figure 8C:
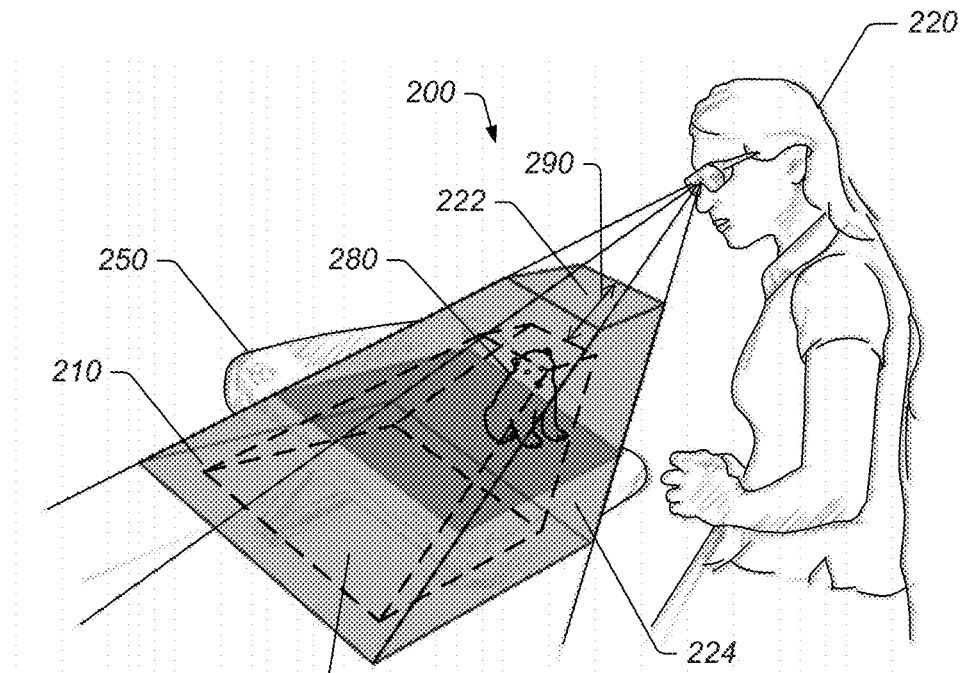
Figure 8D:
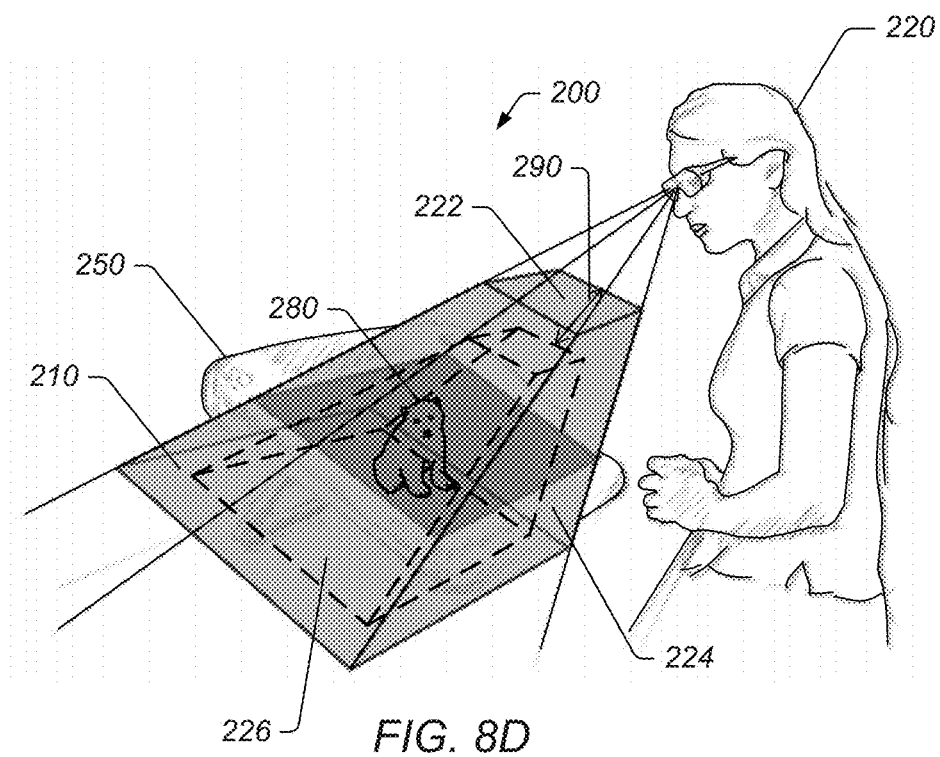

Thus, as shown in FIG. 8A, the functional unit of 3D stereoscopic display system 200 may be configured to display content 280 at a first position in the virtual 3D space relative to the point of view of user 220. Note that the first position may correspond to a position within the coupled zone as illustrated. In certain embodiments the functional unit may be configured to determine that content 280, or a portion of content 280, is not contained, or is not completely within, coupled zone 210 as shown in FIG. 8B. In some embodiments, the functional unit may be configured to determine that the content 280, or a portion of content 280, is within a specified distance, such as distance 290, from a boundary, such as boundaries 222-226 (note that not all boundaries are labelled) of coupled zone 210 as shown in FIG. 8C. Once content 280, or a portion of the content 280, has been determined to not be in coupled zone 280 or within specified distance 290 from a boundary of coupled zone 210, display of the content 280 in the virtual 3D space may be adjusted such that content 280 has a second position in the virtual 3D space that may correspond or map to another position within coupled zone 210. In other words, in response to determining that content 280 is not contained in coupled zone 210 or is within specified distance 290 from a boundary of coupled zone 210, display of content 280 may be adjusted such that content 280 is repositioned within coupled zone 210. Thus, after adjustment, content 280 (at the second position) may be fully contained within coupled zone 210 as shown if FIG. 8D.

Note that in various embodiments, the specified distance may be a static value or a dynamic value that may be automatically adjusted based on the displayed content and user feedback. The distance may be specified in standard linear units, such as inches or millimeters, or may be specified in pixels, among other units of measure. Additionally, the specified distance may be based on, or a function of, the user's point of view. Accordingly, the specified distance may vary as the user's point of view varies. Additionally, in certain embodiments, each boundary may have a corresponding specified distance. Thus, the upper boundary of the coupled zone may have a different specified distance than the bottom or side boundaries of the coupled zone.

Further Embodiments

In further embodiments of the above described system, the system, or more particularly, a functional unit of the system, may be configured to detect position and movements of the user's head via a head tracking system. In certain embodiments the head tracking system may include components described above in reference to FIG. 7 such as cameras 160 and glasses 140, among other components. Additionally, the system may be configured to determine that the point of view of the user may have changed based on detecting the position and movements of the user's head. In other words, the user may have a first point of view at a first time, and the system may detect that the user has a second point of view at a subsequent time. Note that the change in point of view may change the coupled zone of the 3D stereoscopic display. Hence the changed, or second, point of view may result in a changed, or second, coupled zone. Thus, the system may be configured to determine a size and a shape of the changed, or second, coupled zone. In such embodiments, in order to determine that displayed content, such as content 280 above, is not contained in the coupled zone or is within a specified distance from a boundary of the coupled zone, the system may be further configured to determine that the content is not contained within the changed, or second, coupled zone, or is within a specified distance from a boundary of the second coupled zone. Further, in such embodiments, in order to adjust display of the content in the virtual 3D space, the system may be further configured to adjust display of the content such that the content is displayed at another, or second position, in the virtual 3D space. Accordingly, the second position may correspond to a position within the second coupled zone.

In an exemplary embodiment, the system may be further configured to perform one or more additional adjustments in response to determining that the content, or a portion of the content is not contained in the coupled zone, i.e., the currently defined coupled zone respective to the user's point of view or is within a specified distance from a boundary of the coupled zone. These additional adjustments may further prevent or ameliorate user discomfort caused by display of content outside or near boundaries of the coupled zone.

For example, in certain embodiments, the system may be configured to partition, or portion, the 3D stereoscopic display into multiple, e.g., one or more, regions. In such embodiments, the system may be configured to adjust the disparity of one or more of the regions. Note that the disparity of content, or more particularly, of an object or region of the content, is a result of rendering the object or region of the content with a particular projection. Note further that the term disparity refers to the difference between the left eye and right eye images of a 3D stereoscopic display and may be described in at least two ways. First, with reference to the display device, i.e., the 3D stereoscopic display, disparity may be described by the number of pixels of separation between corresponding positions of the image of the content being displayed or rendered, i.e., the pixels of separation between the left eye and right eye images of the content. Alternatively, or in addition, with respect to the point of view of the user, disparity may be described by the degree of angular separation between corresponding positions in the images, or content, being displayed, or rendered, i.e., the angular separation between the left eye and right eye images of the content. Additionally, note that the term projection refers to the display of content, e.g., a 3D object, on a two dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

In certain embodiments, adjustment of disparity in the one or more regions may include limiting the disparity within a particular region to a particular range of disparity (values). In other words, the content to be displayed within a particular region may be displayed or rendered such that the disparity within the particular region is limited based on the range of disparity. Thus, adjustment of disparity in one or more regions may aid in enhancement of the coupled zone and, hence, user comfort.

Additionally, in certain embodiments, the size of images rendered in one or more regions may be adjusted. Additionally, or instead, the perspective of the images rendered in one or more regions may be adjusted. In other words, by modifying the projection being used, either via adjustment to the size or perspective of the rendered image, for an image in a specific region, the disparity of the resultant image being rendered may be limited to a disparity range that may correspond to, or be particular to, the specific region. Thus, in certain embodiments, the virtual 3D space may be divided into multiple regions and each region may be rendered with a different projection to achieve a particular or specified disparity, e.g., a disparity value within the desired range.

In some embodiments, disparity in a first region may be clamped, or limited. Additionally, disparity in a second region may be adjusted. Thus, in certain embodiments, it may be determined that at least one of the regions may extend beyond the coupled zone or may be located between the coupled zone and the user with in the virtual 3D space, and may have disparity values above a specified threshold of disparity for the region. In response, the disparity in such regions may be clamped, or limited, by changing or correcting the projection for any content rendered for the regions.

In certain embodiments, the content may include a background region and a region of interest (foreground object or "figure"), i.e., a user selected region or a region of focus. Accordingly, in some embodiments, the background or areas outside of the region of interest may be blurred. Alternatively, both the background and areas outside of the region of interest may be blurred. Additionally, in certain embodiments, areas outside of the coupled zone may be blurred. Note that the background region may be defined as a region sufficiently behind the coupled zone such that minimal to no detail or focus may be desirable or necessary. Examples of background regions include a skyline and a mountain range, among others. Note that blurring of an object or region may simulate focusing of the human visual system where an object or region outside of the coupled zone, or visual depth of field, may be naturally blurred. Alternatively, all or approximately all of the content may be blurred. Note that blurring of the content may prevent or ameliorate user discomfort by simulating the natural response of the human visual system.

Further, in some embodiments, the brightness of the background and/or the region of interest may be adjusted. Likewise, in some embodiments, the contrast of the background and/or the region of interest may be adjusted. Note that, similar to blurring, adjusting the brightness and contrast of regions, such as the background or a region of interest, may also simulate the human visual system where more optical acuity may be focused on objects in the visual depth of field, or coupled zone. Accordingly, adjusting brightness and contrast may allow the visual system to more naturally focus on objects in the coupled zone of the 3D stereoscopic display and may prevent or ameliorate user discomfort.

In an exemplary embodiment, a region, or portion, of the content that extends beyond the boundary of the coupled zone may be clipped. In other words, all or a portion of the content that is not positioned within the coupled zone may not be displayed, or may be only partially displayed. Said yet another way, clipping a region or portion of content that extends beyond the boundary of the coupled zone may include not rendering, or only partially rendering, objects that are not within the coupled zone. Note that clipping may aid the human visual system focus on the object in the coupled zone and thus, may prevent or ameliorate user discomfort.

Further, in another embodiment, the coupled zone may be portioned, or partitioned, into multiple regions. In such embodiments, each region may have a maximum disparity value and the disparity of each region may be limited to the corresponding maximum disparity value. In other words, different regions may have different desired, or specified, disparity levels and the desired, or specified, disparity level may be defined for each of the regions. Thus, for example, in one exemplary embodiment the coupled zone may be partitioned such that there may be one region in front of the coupled zone and two regions behind the coupled zone. Accordingly, in such an embodiment, the disparity in each of the regions may be limited based on the specified disparity levels for region. In some embodiments, each region may have a specified range of disparity levels or values, and content therein may be displayed accordingly.

In a particular embodiment, determining that the content is not contained in the coupled zone or is within a specified distance from a boundary of the coupled zone may further include determining that the content is moving within the coupled zone at a rate (or speed). In other words, in response to user manipulation of the content or programmatic control of position of the content in the virtual 3D space, the system may determine that the content is moving at a rate. In such embodiments, adjusting the display of content may further include limiting the rate of movement of the content within the coupled zone. Note that limiting the rate of movement of the content may limit the rate at which disparity changes. For example, if the content includes a sphere moving from left to right inside the coupled zone and the system determines the sphere is approaching the right edge of the coupled zone (e.g., is also within some distance of the right edge), the speed of the sphere's movement may be decreased, or even stopped, before the sphere exits the coupled zone. Note that any object within the content may be tracked for movement. Additionally, more than one object within the content may be tracked for movement. Accordingly, such tracking and adjustments may be performed for any object moving in the coupled zone.

In one embodiment, multiple virtual cameras may be used to implement multiple disparity regions by rendering the content with multiple rendering passes. Note that a virtual camera may represent or correspond to the rendering parameters for a particular point of view of a user. In such embodiments, each pass may include rendering the objects of the content in a particular disparity region with an appropriately configured camera and projection to maintain proper or desired disparity limits in the region. The regions may be defined spatially or stereoscopically. That is, the regions may be defined as portions of the virtual 3D space or the regions may be based on respective renderings for the left eye and right eye. In one particular embodiment, the regions may be defined both spatially and stereoscopically.

It should be noted that one or more of the above described adjustments may have unintended, or collateral, effects on the content displayed. For example, if the user employs a stylus, such as stylus 130 described above, to interact with the content, and initiates display of a rendered laser pointer (i.e., a simulation of a laser emanating from the tip of the stylus and extending to a region of interest within the content in a straight line), the above described adjustments may alter the appearance of the rendered laser resulting in the laser no longer appearing as a straight line, e.g., similar to the visual distortions of an image of a straight edge that crosses a boundary between volumes with different indices of refraction, e.g., air and water. Thus, in another embodiment, the system may be configured to partition the coupled zone into regions and incrementally adjust each portion, or segment, of the rendered laser beam that corresponds to a particular region of the coupled zone such that the segments of the rendered laser beam may line up to render a straight line after the adjustment of the content. Alternatively, a segment of the rendered laser beam may be hidden if display would result in a broken, or discontinuous, line and only the final endpoint of the laser may be rendered after the adjustment of the content.

Figure 9:
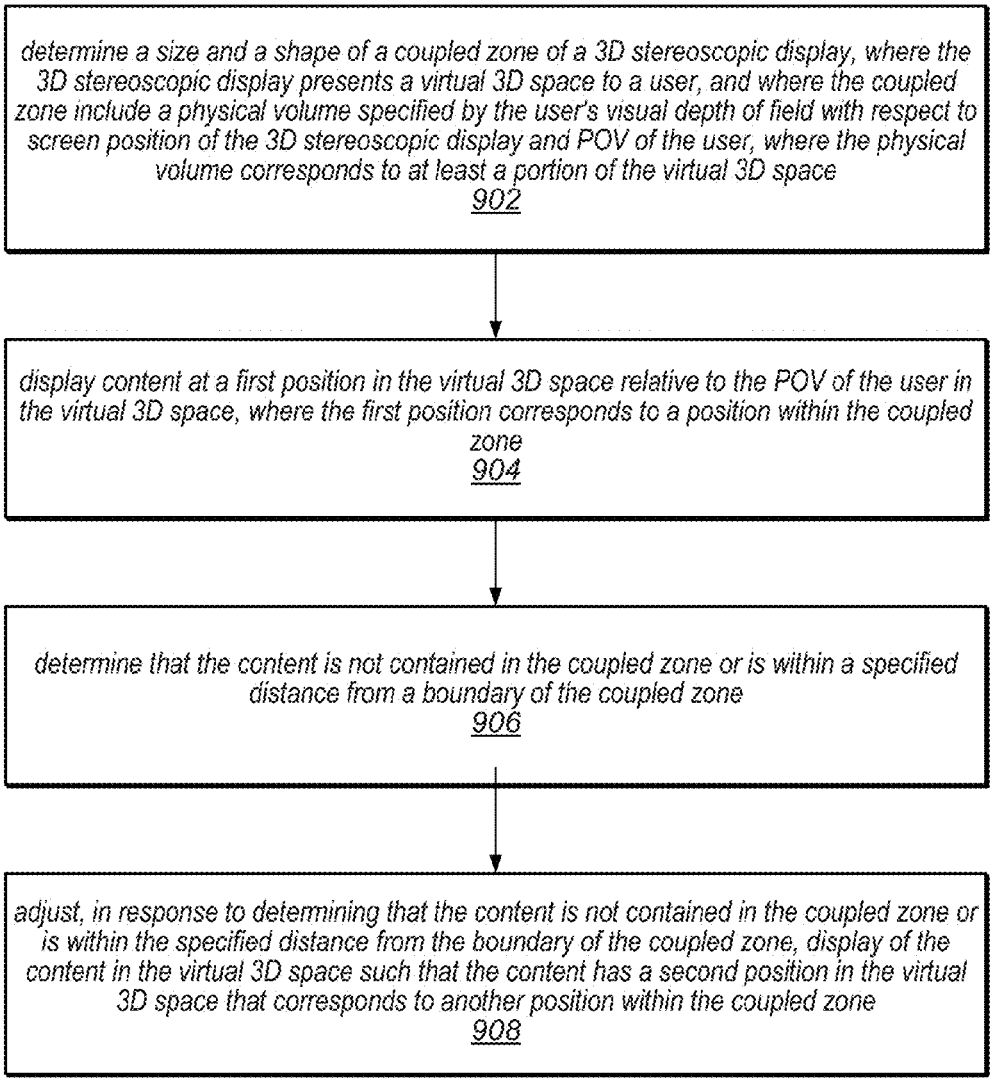
FIG. 9 is a block diagram of a method for presenting content via a 3D stereoscopic display.

FIG. 9: Block Diagram of a Method for Presenting Content via a 3D Stereoscopic Display FIG. 9 illustrates an exemplary embodiment of a method for presenting content via a 3D stereoscopic display. The method shown in FIG. 9 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

In 902, a size and a shape of a coupled zone of a 3D stereoscopic display may be determined. The 3D stereoscopic display may present a virtual 3D space to a user. The coupled zone may include a physical volume specified by the user's visual depth of field with respect to screen position of the 3D stereoscopic display and a point of view of the user. Note that the physical volume may correspond to a portion of the virtual 3D space.

In 904, content, i.e., computer generated stereoscopic images suitable for generating virtual 3D images and scenery, may be displayed at a first position in the virtual 3D space. The content may be displayed relative to the point of view of the user in the virtual 3D space. The first position may correspond to a position within the coupled zone of the 3D stereoscopic display.

In 906, the content, or a portion of the content, may be determined to not be contained in the coupled zone of the 3D stereoscopic display or within a specified distance from a boundary of the coupled zone. Note that the specified distance may be a static value or a dynamic value that may be automatically adjusted based on the displayed content and user feedback. It may be specified in linear units, such as inches or millimeters, or it may be specified in pixels, among other units of measure. Additionally, the specified distance may be based on, or a function of, the user's point of view. Accordingly, the specified distance may vary as the user's point of view varies. Additionally, in certain embodiments, each boundary may have a corresponding specified distance. Thus, the upper boundary of the coupled zone may have a different specified distance than the bottom or side boundaries of the coupled zone.

In certain embodiments the coupled zone may be a first coupled zone and the point of view of the user, may be a first point of view of the user. In such embodiments, the method may further include determining position and movements of the user's head via a head tracking system, such as the head tracking system described Additionally, the system may be configured to determine that the point of view of the user may have changed based on detecting the position and movements of the user's head. In other words, the user may have a first point of view at a first time, and a second point of view of the user may be detected at a subsequent time. Note that the change in point of view may change the coupled zone of the 3D stereoscopic display. Hence the changed, or second, point of view may result in a changed, or second, coupled zone. Thus, a size and a shape of the changed, or second, coupled zone may be determined. Further, in such embodiments, in order to determine that displayed content is not contained in the coupled zone or is within a specified distance from a boundary of the coupled zone, the method may further include determining that the content is not contained within the changed, or second, coupled zone or is within a specified distance from a boundary of the second coupled zone.

Additionally, in a particular embodiment, determining that the content is not contained in the coupled zone or is within a specified distance from a boundary of the coupled zone may further include determining that the content is moving within the coupled zone at a rate (or speed). In other words, in response to user manipulation of the content or programmatic control of position of the content in the virtual 3D space, the system may further determine that the content is moving at a rate.

In 908, in response to determining that the content, or a portion of the content, is not contained in the coupled zone or is within a specified distance from the boundary of the coupled zone, display of the content in the virtual 3D space may be adjusted such that the content has a second position in the virtual 3D space that corresponds to another position within the coupled zone.

In further embodiments, the method may further include one or more additional adjustments in response to determining that the content, or a portion of the content is not contained in the coupled zone, i.e., the currently defined coupled zone respective to the user's point of view or is within a specified distance from a boundary of the coupled zone. These additional adjustments may further prevent or ameliorate user discomfort caused by display of content outside or near boundaries of the coupled zone.

Thus, in certain embodiments, the method may further include partitioning, or portioning, the 3D display into multiple, e.g., one or more, regions. In other words, the virtual 3D space may be virtually partitioned or portioned into one or more regions. In such embodiments, the method may further include adjusting the disparity of one or more of the regions. Note that the disparity of content, or more particularly, of an object or region of the content, is a result of rendering the object or region of the content with a particular projection. Note further that the term disparity refers to the difference between the left eye and right eye images of a 3D stereoscopic display and may be described in at least two ways. First, with reference to the display device, i.e., the 3D stereoscopic display, disparity may be described by the number of pixels of separation between corresponding positions of the image or of the content being displayed or rendered, i.e., the pixels of separation between the left eye and right eye images of the content. Alternatively, or in addition, with respect to the point of view of the user, disparity may be described by the degree of angular separation between corresponding positions in the images, or content, being displayed, or rendered, i.e., the angular separation between the left eye and right eye images of the content. Additionally, note that the term projection refers to the display of content, e.g., a 3D object on a two dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

In certain embodiments, adjustment of disparity in the one or more regions may include limiting the disparity within a particular region to a particular range of disparity (values). In other words, the content to be displayed within a particular region may be re-displayed or rendered such that the disparity within the particular region is limited based on the range of disparity. Thus, adjustment of disparity in one or more regions may aid in enhancement of the coupled zone and, hence, user comfort.

Additionally, in certain embodiments, the size of images rendered in one or more regions may be adjusted. Further, the perspective of the images rendered in one or more regions may be adjusted. In other words, by modifying the projection being used, either via adjustment to the size or perspective of the rendered image, for an image in a specific region, the disparity of the resultant image being rendered may be limited to a disparity range that may correspond to, or be particular to, the specific region. Thus, in certain embodiments, the virtual 3D space may be divided into multiple regions and each region may be rendered with a different projection to achieve a particular or specified disparity, e.g., a disparity value within the desired range.

In some embodiments, disparity in a first region may be clamped, or limited. Additionally, disparity in a second region may be adjusted. Thus, in certain embodiments, it may be determined that at least one of the regions may extend beyond the coupled zone or may be located between the coupled zone and the user with in the virtual 3D space, and may have disparity values above a specified threshold of disparity for the region. In response, the disparity in such regions may be clamped, or limited, by changing or correcting the projection for any content rendered for the regions.

In certain embodiments of the method, the content may include a background region and a region of interest (foreground object or "figure"), i.e., a user selected region or a region of focus. Accordingly, in some embodiments, the background or areas outside of the region of interest may be blurred. Alternatively, both the background and areas outside of the region of interest may be blurred. Additionally, in certain embodiments, areas outside of the coupled zone may be blurred. Note that the background region may be defined as a region sufficiently behind the coupled zone such that minimal to no detail or focus may be desirable or necessary. Examples of background regions include a skyline and a mountain range, among others. Note that blurring of an object or region may simulate focusing of the human visual system where an object or region outside of the coupled zone, or visual depth of field, may be naturally blurred. Alternatively, all or approximately all of the content may be blurred. Note that blurring of the content may prevent or ameliorate user discomfort by simulating the natural response of the human visual system.

Further, in some embodiments, the brightness of the background and/or the region of interest may be adjusted. Likewise, in some embodiments, the contrast of the background and/or the region of interest may be adjusted. Note that, similar to blurring, adjusting the brightness and contrast of regions, such as the background or a region of interest, may also simulate the human visual system where more optical acuity may be focused on objects in the visual depth of field, or coupled zone. Accordingly, adjusting brightness and contrast may allow the visual system to more naturally focus on objects in the coupled zone of the 3D stereoscopic display and may prevent or ameliorate user discomfort.

In an exemplary embodiment, a region, or portion, of the content that extends beyond the boundary of the coupled zone may be clipped. In other words, all or a portion of the content that is not positioned within the coupled zone may not be displayed, or may be only partially displayed. Said yet another way, clipping a region or portion of content that extends beyond the boundary of the coupled zone may include not rendering, or only partially rendering, objects that are not within the coupled zone. Note that clipping may aid the human visual system focus on the object in the coupled zone and thus, may prevent or ameliorate user discomfort.

Further, in another embodiment, the coupled zone may be portioned, or partitioned, into multiple regions. In such embodiments, each region may have a maximum disparity value and the disparity of each region may be limited to the corresponding maximum disparity value. In other words, different regions may have different desired, or specified, disparity levels and the desired, or specified, disparity level may be defined for each of the regions. Thus, for example, in one embodiment the coupled zone may be partitioned such that there may be one region in front of the coupled zone and two regions behind the coupled zone. Accordingly, in such an embodiment, the disparity in each of the regions may be limited based on the specified disparity levels for region. In some embodiments, each region may have a specified range of disparity levels or values, and content therein may be displayed accordingly.

Further, in embodiments in which the method may determine that the point of view of the user may have changed, i.e., the method may determine that there is a changed, or second coupled zone, the method may further include display of the content such that the content is displayed at another, or second position, in the virtual 3D space that may correspond to a position within the second coupled zone.

In a particular embodiment, determining that the content is not contained in the coupled zone or is within a specified distance from a boundary of the coupled zone may further include determining that the content is moving within the coupled zone at a rate (or speed). In other words, in response to user manipulation of the content or programmatic control of position of the content in the virtual 3D space, the system may determine that the content is moving at a rate. In such embodiments, adjusting the display of content may further include limiting the rate of movement of the content within the coupled zone. Note that limiting the rate of movement of the content may limit the rate at which disparity changes. For example, if the content includes a sphere moving from left to right inside the coupled zone and the system determines the sphere is approaching the right edge of the coupled zone (e.g., is also within some distance of the right edge), the speed of the sphere's movement may be decreased, or even stopped, before the sphere exits the coupled zone. Note that any object within the content may be tracked for movement. Additionally, more than one object within the content may be tracked for movement. Accordingly, such tracking and adjustments may be performed for any object moving in the coupled zone.

In one embodiment, multiple virtual cameras may be used to implement multiple disparity regions by rendering the content with multiple rendering passes. Note that a virtual camera may represent or correspond to the rendering parameters for a particular point of view of a user. In such embodiments, each pass may include rendering the objects of the content in a particular disparity region with an appropriately configured camera and projection to maintain proper or desired disparity limits in the region. The regions may be defined spatially or stereoscopically. That is, the regions may be defined as portions of the virtual 3D space or the regions may be based on respective renderings for the left eye and right eye. In one particular embodiment, the regions may be defined both spatially and stereoscopically.

It should be noted that one or more of the above described adjustments may have unintended, or collateral, effects on the content displayed. For example, if the user employs a stylus, such as stylus 130 described above in reference to FIG. 7, to interact with the content and initiates display of a rendered laser pointer (i.e., a simulation of a laser emanating from the tip of the stylus and extending to a region of interest within the content in a straight line), the above described adjustments may alter the appearance of the rendered laser resulting in the laser no longer appearing as a straight line, e.g., similar to the visual distortions of an image of a straight edge that crosses a boundary between volumes with different indices of refraction, e.g., air and water. Thus, in another embodiment, the method may further include partitioning the coupled zone into regions and incrementally adjusting each portion, or segment, of the rendered laser beam that corresponds to a particular region of the coupled zone such that the segments of the rendered laser beam may line up to render a straight line after the adjustment of the content. Alternatively, a segment of the rendered laser beam may be hidden if display would result in a broken, or discontinuous, line and only the final endpoint of the laser may be rendered after the adjustment of the content.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for presenting three dimensional (3D) virtual content via a 3D stereoscopic display, comprising:
   determining a size and a shape of a coupled zone of a 3D stereoscopic display, wherein the 3D stereoscopic display presents a virtual 3D space to a user, and wherein the coupled zone comprises a physical volume specified by the user's visual depth of field with respect to screen position of the 3D stereoscopic display and a point of view (POV) of the user, wherein the physical volume corresponds to at least a portion of the virtual 3D space;
   displaying the 3D virtual content at a first position in the virtual 3D space relative to the POV of the user in the virtual 3D space, wherein the first position corresponds to a position within the coupled zone;
   determining that the 3D virtual content is not contained in the coupled zone or is within a specified distance from a boundary of the coupled zone, comprising determining that the 3D virtual content is moving within the coupled zone at a rate; and
   adjusting, in response to said determining, display of the 3D virtual content in the virtual 3D space such that the 3D virtual content has a second position in the virtual 3D space that corresponds to another position within the coupled zone, comprising:
      adjusting size of images rendered in one or more regions of the 3D virtual content; and
      limiting the rate at which the 3D virtual content is moving with the coupled zone, thereby limiting a rate at which disparity changes within the coupled zone.

2. The method of claim 1, wherein the coupled zone is a first coupled zone, wherein the POV of the user is a first POV of the user, wherein the method further comprises:
   detecting position and movements of the user's head via a head tracking system;
   determining a second POV of the user based on said detecting;
   determining a size and a shape of a second coupled zone of the 3D stereoscopic display; and
   wherein said determining that the 3D virtual content is not contained in the coupled zone further comprises:
      determining that the 3D virtual content is not contained in the second coupled zone or is within a specified distance from a boundary of the second coupled zone; and
   wherein said adjusting further comprises:
      adjusting display of the 3D virtual content in the virtual 3D space such that the second position in the virtual 3D space corresponds to a position within the second coupled zone.

3. The method of claim 1, wherein said adjusting further comprises:
   adjusting disparity of one or more regions of the 3D virtual content.

4. The method of claim 1, wherein said adjusting further comprises:
   adjusting perspective of the images rendered in the one or more regions.

5. The method of claim 1, wherein said adjusting comprises:
   clamping disparity in a first region of the coupled zone; and
   adjusting disparity in a second region of the coupled zone.

6. The method of claim 1, wherein the 3D virtual content comprises a region of interest and a background, wherein said adjusting further comprises:
   blurring one or more of:
      the region of interest of the 3D virtual content; or
      the background of the 3D virtual content.

7. The method of claim 1, wherein said adjusting further comprises:
   blurring approximately all of the 3D virtual content.

8. The method of claim 1, wherein the 3D virtual content comprises a region of interest and a background, wherein said adjusting further comprises:
   adjusting the brightness of one or more of:
      the region of interest of the 3D virtual content; or
      the background of the 3D virtual content.

9. The method of claim 1, wherein the 3D virtual content comprises a region of interest and a background, wherein said adjusting further comprises:
   adjusting the contrast of one or more of:
      the region of interest of the 3D virtual content; or
      the background of the 3D virtual content.

10. The method of claim 1, wherein said adjusting further comprises:
    clipping a region of the 3D virtual content that extends beyond the boundary of the coupled zone.

11. The method of claim 1, wherein said determining that the 3D virtual content is moving further comprises determining that the 3D virtual content is moving in response to one or more of:
    user input manipulating the 3D virtual content; or
    programmatic control of position of the 3D virtual content in the virtual 3D space.

12. The method of claim 1, wherein said adjusting further comprises:
    partitioning the coupled zone into a plurality of regions, wherein each region of the plurality of regions has a corresponding maximum disparity value; and
    limiting the disparity of each region to the corresponding maximum disparity value.

13. A non-transitory computer readable memory medium storing programming instructions executable by a processor to:
    determine a size and a shape of a coupled zone of a three dimensional (3D) stereoscopic display, wherein the 3D stereoscopic display presents a virtual 3D space to a user, and wherein the coupled zone comprises a physical volume specified by the user's visual depth of field with respect to screen position of the 3D stereoscopic display and a point of view (POV) of the user, wherein the physical volume corresponds to at least a portion of the virtual 3D space;
    display 3D virtual content at a first position in the virtual 3D space relative to the POV of the user in the virtual 3D space, wherein the first position corresponds to a position within the coupled zone;
    determine that the 3D virtual content is not contained in the coupled zone or is within a specified distance from a boundary of the coupled zone, wherein to determine that the 3D virtual content is not contained in the coupled zone or is within a specified distance from a boundary of the coupled zone, the programming instructions are further executable by the processor to determine that the 3D virtual content is moving within the coupled zone at a rate; and adjust, in response to said determining, display of the 3D virtual content in the virtual 3D space such that the 3D virtual content has a second position in the virtual 3D space that corresponds to another position within the coupled zone, wherein to adjust display of the 3D virtual content, the programming instructions are executable by the processor to limit the rate at which the 3D virtual content is moving, thereby limiting a rate at which disparity changes.

14. The non-transitory computer readable memory medium of claim 13, wherein the coupled zone is a first coupled zone, wherein the POV of the user is a first POV of the user, wherein the programming instructions are further executable by a processor to:

detect position and movements of the user's head via a head tracking system;

determine a second POV of the user based on said detecting;

determine a size and a shape of a second coupled zone of the 3D stereoscopic display;

wherein to determine that the 3D virtual content is not contained in the coupled zone, the programming instructions are further executable by a processor to:

determine that the 3D virtual content is not contained in the second coupled zone or is within a specified distance from a boundary of the second coupled zone; and wherein to adjust the display of the 3D virtual content, the programming instructions are further executable by a processor to:

adjust display of the 3D virtual content in the virtual 3D space such that the second position in the virtual 3D space corresponds to a position within the second coupled zone.

15. The non-transitory computer readable memory medium of claim 13, wherein to adjust display of the 3D virtual content, the programming instructions are further executable by a processor to:

adjust disparity of one or more regions of the 3D virtual content.

16. The non-transitory computer readable memory medium of claim 13, wherein to adjust display of the 3D virtual content, the programming instructions are further executable by a processor to:

adjust perspective of the images rendered in the one or more regions.

17. The non-transitory computer readable memory medium of claim 13, wherein to adjust display of the 3D virtual content, the programming instructions are further executable by a processor to:

clamp disparity in a first region of the coupled zone; and adjust disparity in a second region of the coupled zone.

18. The non-transitory computer readable memory medium of claim 13, wherein the 3D virtual content comprises a region of interest and a background, wherein to adjust display of the 3D virtual content, the programming instructions are further executable by a processor to:

blurring one or more of:
the region of interest of the 3D virtual content; or
the background of the 3D virtual content.

19. The non-transitory computer readable memory medium of claim 13, wherein to adjust display of the 3D virtual content, the programming instructions are further executable by a processor to:

blur approximately all of the 3D virtual content.

20. The non-transitory computer readable memory medium of claim 13, wherein the 3D virtual content comprises a region of interest and a background, wherein to adjust display of the 3D virtual content, the programming instructions are further executable by a processor to:

adjust the brightness of one or more of:
the region of interest of the 3D virtual content; or
the background of the 3D virtual content.

21. The non-transitory computer readable memory medium of claim 13, wherein the 3D virtual content comprises a region of interest and a background, wherein to adjust display of the 3D virtual content, the programming instructions are further executable by a processor to:

adjust the contrast of one or more of:
the region of interest of the 3D virtual content; or
the background of the 3D virtual content.

22. The non-transitory computer readable memory medium of claim 13, wherein to adjust display of the 3D virtual content, the programming instructions are further executable by a processor to:

clip a region of the 3D virtual content that extends beyond the boundary of the coupled zone.

23. The non-transitory computer readable memory medium of claim 13, wherein to determine that the 3D virtual content is moving, the programming instructions are further executable by a processor to determine that the 3D virtual content is moving in response to one or more of:

user input manipulating the 3D virtual content; or
programmatic control of position of the 3D virtual content in the virtual 3D space.

24. The non-transitory computer readable memory medium of claim 13, wherein to adjust display of the 3D virtual content, the programming instructions are further executable by a processor to:

partition the coupled zone into a plurality of regions, wherein each region of the plurality of regions has a corresponding maximum disparity value; and limit the disparity of each region to the corresponding maximum disparity value.

25. A system for presenting three dimensional (3D) virtual content via a 3D stereoscopic display, comprising:

a 3D stereoscopic display, comprising:
at least one display; and
at least one functional unit coupled to the at least one display and configured to:
determine a size and a shape of a coupled zone of a 3D stereoscopic display, wherein the 3D stereoscopic display presents a virtual 3D space to a user, and wherein the coupled zone comprises a physical volume specified by the user's visual depth of field with respect to screen position of the 3D stereoscopic display and a point of view (POV) of the user, wherein the physical volume corresponds to at least a portion of the virtual 3D space;
display 3D virtual content at a first position in the virtual 3D space relative to the POV of the user in the virtual 3D space, wherein the first position corresponds to a position within the coupled zone;
determine that the 3D virtual content is not contained in the coupled zone or is within a specified distance from a boundary of the coupled zone, wherein to determine that the 3D virtual content is not contained in the coupled zone or is within a specified distance from a boundary of the coupled zone, the at least one functional unit is further configured to determine that the 3D virtual content is moving within the coupled zone at a rate; and adjust, in response to said determining, display of the 3D virtual content in the virtual 3D space such that the 3D virtual content has a second position in the virtual 3D space that corresponds to another position within the coupled zone, wherein to adjust display of the 3D virtual content, the at least one functional unit is further configured to:

adjust size of images rendered in one or more regions of the 3D virtual content; and limit the rate at which the 3D virtual content is moving, thereby limiting a rate at which disparity changes.

26. The system of claim 25, wherein the coupled zone is a first coupled zone, wherein the POV of the user is a first POV of the user, wherein the system further comprises:

one or more devices configured to measure position of a user's head;

wherein the at least one functional unit is further configured to:

detect position and movements of the user's head via a head tracking system;

determine a second POV of the user based on said detecting;

determine a size and a shape of a second coupled zone of the 3D stereoscopic display;

wherein to determine that the 3D virtual content is not contained in the coupled zone, the at least one functional unit is further configured to:

determine that the 3D virtual content is not contained in the second coupled zone or is within a specified distance from a boundary of the second coupled zone; and wherein to adjust the display of the 3D virtual content, the at least one functional unit is further configured to:

adjust display of the 3D virtual content in the virtual 3D space such that the second position in the virtual 3D space corresponds to a position within the second coupled zone.

27. The system of claim 25, wherein to determine that the 3D virtual content is moving, the at least one functional unit is further configured to determine that the 3D virtual content is moving in response to user input manipulating the 3D virtual content.

28. The system of claim 25, wherein to adjust display of the 3D virtual content, the at least one functional unit is further configured to:

partition the coupled zone into a plurality of regions, wherein each region of the plurality of regions has a corresponding maximum disparity value; and limit the disparity of each region to the corresponding maximum disparity value.

* * * * *